(12) United States Patent
Jiang et al.

(10) Patent No.: US 7,416,790 B2
(45) Date of Patent: Aug. 26, 2008

(54) COATING SYSTEMS CONTAINING RHODIUM ALUMINIDE-BASED LAYERS

(75) Inventors: Liang Jiang, Schenectady, NY (US); Michael Francis Xavier Gigliotti, Jr., Scotia, NY (US); Mark Daniel Gorman, West Chester, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/608,310

(22) Filed: Dec. 8, 2006

(65) Prior Publication Data

US 2008/0138647 A1 Jun. 12, 2008

(51) Int. Cl.
B32B 15/01 (2006.01)
B32B 15/04 (2006.01)
B32B 15/20 (2006.01)

(52) U.S. Cl. .................. 428/668; 428/650; 428/652; 428/670; 428/680

(58) Field of Classification Search .................. 428/630, 428/631, 632, 633, 650, 652, 670, 668, 680, 428/700
See application file for complete search history.

(56) References Cited

U.S. PATENT DOCUMENTS

| | | | |
|---|---|---|---|
| 3,961,910 A * | 6/1976 | Baladjanian et al. | 428/652 |
| 5,427,866 A | 6/1995 | Nagaraj et al. | |
| 6,306,524 B1 | 10/2001 | Spitsberg et al. | |
| 6,455,167 B1 | 9/2002 | Rigney et al. | |
| 6,551,063 B1 | 4/2003 | Lee et al. | |
| 6,554,920 B1 | 4/2003 | Jackson et al. | |
| 6,582,534 B2 | 6/2003 | Jackson et al. | |
| 6,609,894 B2 | 8/2003 | Jackson et al. | |
| 6,623,692 B2 | 9/2003 | Jackson et al. | |
| 6,720,088 B2 | 4/2004 | Zhao et al. | |
| 6,746,782 B2 | 6/2004 | Zhao et al. | |
| 6,921,586 B2 | 7/2005 | Zhao et al. | |
| 2003/0079810 A1 | 5/2003 | Jackson et al. | |
| 2003/0186075 A1 | 10/2003 | Zhao et al. | |
| 2005/0064228 A1 | 3/2005 | Darolia et al. | |
| 2005/0079368 A1 | 4/2005 | Gorman et al. | |
| 2005/0118334 A1 | 6/2005 | Gorman et al. | |
| 2005/0265888 A1 | 12/2005 | Liang et al. | |
| 2006/0093851 A1 | 5/2006 | Darolia et al. | |

* cited by examiner

*Primary Examiner*—Michael La Villa
(74) *Attorney, Agent, or Firm*—William Scott Andes; Gary M. Hartman; Domenica N.S. Hartman

(57) ABSTRACT

A coating process and system suitable for use on components subjected to high temperatures. The coating system includes an overlay coating of predominantly B2 phase rhodium aluminide (RhAl) intermetallic compound containing about 25 to about 90 atomic percent rhodium, about 10 to about 60 atomic percent aluminum, optionally up to a combined total of about 25 atomic percent of one or more platinum group metals chosen from the group consisting of platinum, palladium, ruthenium, and iridium, and up to about 20 atomic percent of the base metal and alloying constituents of the substrate. The RhAl intermetallic coating may serve as an environmental coating, a diffusion barrier layer for an overlying environmental coating, or both, with or without an outer ceramic coating.

15 Claims, 3 Drawing Sheets

US 7,416,790 B2

COATING SYSTEMS CONTAINING RHODIUM ALUMINIDE-BASED LAYERS

BACKGROUND OF THE INVENTION

The present invention generally relates to protective coating systems for components exposed to high temperatures, such as the hostile thermal environment of a gas turbine engine. More particularly, this invention relates to coating systems that contain rhodium aluminide-based layers as, for example, environmental coatings, bond coats, and diffusion barrier layers.

Certain components of the turbine, combustor and augmentor sections that are susceptible to damage by oxidation and hot corrosion attack are typically protected by an environmental coating and optionally a thermal barrier coating (TBC), in which case the environmental coating is termed a bond coat that in combination with the TBC forms what has been termed a TBC system. Environmental coatings and TBC bond coats are often formed of an oxidation-resistant aluminum-containing alloy or intermetallic whose aluminum content provides for the slow growth of a strong adherent continuous aluminum oxide layer (alumina scale) at elevated temperatures. This thermally grown oxide (TGO) provides protection from oxidation and hot corrosion, and in the case of a bond coat promotes a chemical bond with the TBC.

Environmental coatings and TBC bond coats in wide use include diffusion coatings that contain aluminum intermetallics (predominantly beta-phase nickel aluminide (β-NiAl) and platinum-modified nickel aluminides), and overlay coatings such as MCrAlX (where M is iron, cobalt and/or nickel, and X is yttrium, rare earth metals, and reactive metals). Overlay coatings are physically and compositionally distinguishable from diffusion coatings in that a diffusion coating significantly interacts with the substrate it protects during deposition as a result of the diffusion process to form various intermetallic and metastable phases beneath the substrate surface, whereas an overlay coating does not and as a result has a limited diffusion zone and predominantly retains its as-deposited composition, which in the case of MCrAlX is a solid solution alloy. Because TBC life depends not only on the environmental resistance but also the strength of its bond coat, bond coats capable of exhibiting higher strength have also been developed, notable examples of which are beta-phase NiAl overlay coatings. In contrast to the aforementioned MCrAlX overlay coatings, which are metallic solid solutions containing intermetallic phases, the NiAl beta phase is an intermetallic compound that exists for nickel-aluminum compositions containing about 30 to about 60 atomic percent aluminum. Examples of beta-phase NiAl overlay coatings are disclosed in commonly-assigned U.S. Pat. Nos. 5,975,852 to Nagaraj et al., 6,153,313 to Rigney et al., 6,255,001 to Darolia, 6,291,084 to Darolia et al., and 6,620,524 to Pfaendtner et al. The suitability of environmental coatings and TBC bond coats formed of NiAlPt to contain fcc gamma (γ-Ni) and the gamma-prime phase (γ'-Ni$_3$Al) has also been considered, as disclosed in U.S. Patent Application Publication Nos. 2004/0229075 to Gleeson et al., 2006/0093801 to Darolia et al., and 2006/0093850 to Darolia et al.

Aside from use as additives in MCrAlX overlay coatings, diffusion aluminide coatings, and gamma/gamma-prime phase NiAl coatings, platinum and other platinum group metals (PGM) such as rhodium and palladium have been considered as bond coat materials. For example, commonly-assigned U.S. Pat. No. 5,427,866 to Nagaraj et al. discloses PGM-based diffusion bond coats formed by depositing and diffusing platinum, rhodium, or palladium into a substrate surface, or alternatively diffusing a PGM into an otherwise conventional bond coat material.

The above-noted coating materials contain different levels of alloying constituents (e.g., aluminum) relative to the superalloys they protect. Furthermore, superalloys contain various elements, including refractory elements, that are not present or are present in relatively small amounts in these coatings. When bond coats and environmental coatings of the type described above are deposited on superalloy substrates, solid-state diffusion occurs to some degree between the coatings and the substrates at elevated temperatures often encountered by superalloy components. This migration alters the chemical composition and microstructure of both the coating and the substrate in the vicinity of the interface, generally with deleterious results. For example, migration of aluminum out of an aluminide diffusion or overlay coating reduces its oxidation resistance, while interdiffusion with the substrate beneath the coating can result in the formation of topologically close-packed (TCP) phases that, if present at sufficiently high levels, can drastically reduce the load-carrying capability of the alloy. PGM-based bond coats are also limited by their susceptibility to interdiffusion with superalloy substrates, leading to undesirable contamination of the coating and excessive Kirchendall voiding.

In view of the above, diffusion barrier coatings have been developed and evaluated. In addition to inhibiting migration of elements between a coating and the substrate it protects, diffusion barrier coatings must also be oxidation resistant, particularly if the coating is a PGM-based coating due to the oxygen permeability of platinum group metals. Examples of diffusion barriers include ruthenium-based coatings disclosed in commonly-assigned U.S. Pat. Nos. 6,306,524 to Spitsberg et al., 6,720,088 to Zhao et al., and 6,746,782 to Zhao et al. Though the coating systems discussed above represent significant advancements in protective coating systems for high-temperature components, further improvements are desired.

BRIEF SUMMARY OF THE INVENTION

The present invention provides a coating process and system suitable for use on components subjected to high temperatures, including those formed of materials susceptible to damage by oxidation and hot corrosion attack. The coating system includes a layer of predominantly rhodium aluminide (RhAl) intermetallic material that can serve as an environmental coating or a diffusion barrier layer for an overlying environmental coating, with or without a TBC. As a diffusion barrier layer, the RhAl intermetallic layer limits interdiffusion between an environmental coating or bond coat and the substrate it protects, and is believed to be particularly useful for use in combination with environmental coatings that contain or are predominantly formed of a platinum group metal (PGM-containing and PGM-based, respectively).

The RhAl intermetallic material of this invention is in the form of an overlay coating and is part of a coating system used to protect a substrate containing a base metal and various alloying constituents. The overlay coating is predominantly the B2-phase of RhAl intermetallic and contains about 25 to about 90 atomic percent rhodium, about 10 to about 60 atomic percent aluminum, optionally up to a combined total of about 25 atomic percent of one or more platinum group metals (platinum, palladium, ruthenium, and iridium), and up to a combined total of about 20 atomic percent of the base metal and alloying constituents of the substrate. The overlay coating may serve as an environmental coating that defines an outermost surface of the coating system, a bond coat for a ceramic layer deposited on the overlay coating, or a diffusion barrier layer to a second coating deposited on the overlay coating. In the last example, the overlay coating inhibits interdiffusion between the second coating and the substrate, and is particularly effective at inhibiting any platinum group metal contained in the second coating from diffusing into the substrate and inhibiting substrate elements from diffusing into the second coating. If present, the second coating may be a bond coat for a ceramic coating, or may be an environmental coating that defines an outermost surface of the coating system.

Significant advantages of the B2-phase RhAl intermetallic overlay coating of this invention include metallurgical stability, oxidation resistance, impermeability to oxygen, and resistance to migration of platinum group metals and other elements through its thickness. The overlay coating is also able to form an alumina oxide scale that promotes oxidation resistance and adhesion of a ceramic coating, such as a TBC.

Other objects and advantages of this invention will be better appreciated from the following detailed description.

DETAILED DESCRIPTION OF THE INVENTION

Figure 1:
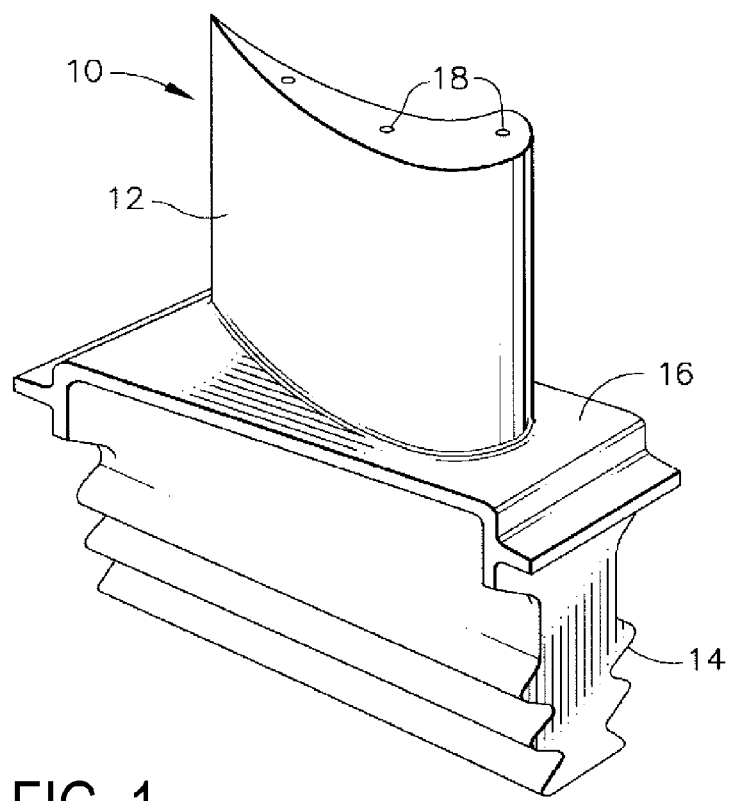
FIG. 1 is a perspective view of a high pressure turbine blade.

The present invention is generally applicable to components that operate within environments characterized by relatively high temperatures, and are therefore subjected to oxidation, hot corrosion, thermal cycling, and thermal stresses. Notable examples of such components include the high and low pressure turbine nozzles and blades, shrouds, combustor liners, and augmentor hardware of gas turbine engines. An example of a high pressure turbine blade 10 is shown in FIG. 1. The blade 10 generally includes an airfoil 12 against which hot combustion gases are directed during operation of the gas turbine engine, and whose surface is therefore subjected to severe environmental conditions. The airfoil 12 is anchored to a turbine disk (not shown) with a dovetail 14 formed on a root section 16 of the blade 10. Cooling passages 18 are present in the airfoil 12 through which bleed air is forced to transfer heat from the blade 10. While the advantages of this invention will be described with reference to components of a gas turbine engine, such as the high pressure turbine blade 10 shown in FIG. 1, the teachings of this invention are generally applicable to any component on which a coating system is used to protect a substrate subjected to elevated temperatures, and particular those susceptible to damage by oxidation and hot corrosion attack.

Figure 2:
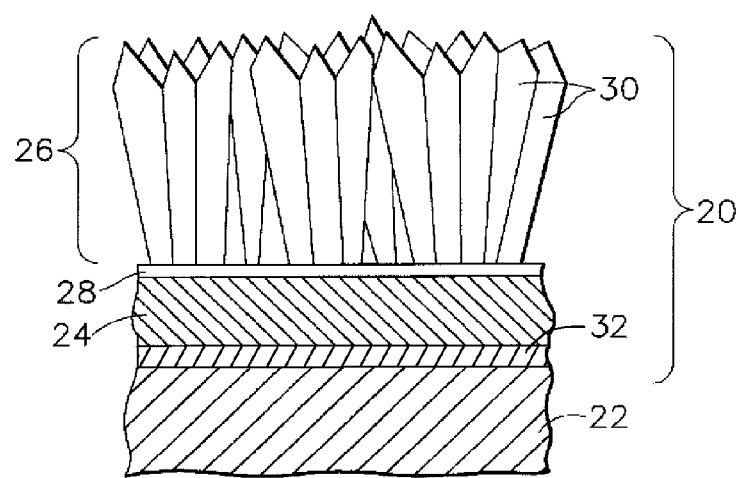
FIG. 2 is a cross-sectional representation of a TBC system on a surface region of the blade of FIG. 1, and depicts a coating system that includes a diffusion barrier coating, a bond coat, and a ceramic layer in accordance with an embodiment of this invention.

Represented in FIG. 2 is a surface region of the blade 10 protected by a coating system 20 in accordance with an embodiment of the present invention. As shown, the coating system 20 includes a bond coat 24 overlying a superalloy substrate 22, which is typically the base material of the blade 10. The bond coat 24 is shown as adhering a thermal-insulating ceramic layer 26, or TBC, to the substrate 22. Suitable materials for the substrate 22 (and therefore the blade 10) include equiaxed, directionally-solidified, and single-crystal superalloy and intermetallic materials. The invention is believed to be especially advantageous for nickel and cobalt-base superalloys that contain chromium and refractory metals (e.g., niobium, tantalum, molybdenum, tungsten and rhenium). A notable example of such an alloy is the nickel-base superalloy known as Rene N5 disclosed in U.S. Pat. No. 6,074,602 and having a nominal composition of, by weight, about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel and incidental impurities.

As shown, the ceramic layer 26 has a strain-tolerant structure with columnar grains 30 produced by depositing the ceramic layer 26 using a physical vapor deposition technique known in the art (e.g., electron beam-physical vapor deposition (EBPVD)), though a plasma spray technique could be used to deposit a noncolumnar ceramic layer. A preferred material for the ceramic layer 26 is an yttria-stabilized zirconia (YSZ), a preferred composition being about 6 to about 8 weight percent yttria (6-8% YSZ), optionally with up to about 60 weight percent of one or more oxides of lanthanide-series elements to reduce thermal conductivity. Other ceramic materials could be used for the ceramic layer 26, such as yttria, nonstabilized zirconia, or zirconia stabilized by magnesia, ceria, scandia, and/or other oxides. The ceramic layer 26 is deposited to a thickness that is sufficient to provide the required thermal protection for the underlying substrate 22 and blade 10, typically on the order of about 75 to about 300 micrometers, though lesser and greater thicknesses are also possible. While described in reference to a coating system 20 that includes a ceramic layer (TBC) 26, the present invention is also applicable to coating systems that exclude a ceramic coating, in which case the bond coat 24 is the outermost layer of the coating system 20 and is termed an environmental coating.

The bond coat 24 is represented in FIG. 2 as an overlay coating. Various physical vapor deposition (PVD) processes can be used to deposit the overlay bond coat 24, including cathodic arc deposition (also called ion plasma deposition (IPD)), sputtering, EBPVD, etc. Notably, as an overlay coating, the bond coat 24 forms a limited diffusion zone in the surface of the substrate 22. However, over time at elevated temperatures, some level of interdiffusion will occur between the bond coat 24 and the substrate 22 as a result of diffusional gradients and changes in elemental solubility in the local region of the substrate 22. Constituents of the bond coat 24 tend to diffuse into the substrate 22, reducing the ability of the bond coat 24 to protect the substrate 22. For example, migration of aluminum out of the bond coat 24 reduces its oxidation resistance, while the accumulation of aluminum in the substrate 22 beneath the bond coat 24 can result in the formation of a deleterious secondary reaction zone (SRZ), particularly if the substrate 22 contains significant amounts of one or more refractory elements, such as tungsten, rhenium, tantalum, molybdenum, and chromium. Depending on the composition of the substrate 22, the SRZ may contain plate-shaped and needle-shaped precipitate phases (such as P, sigma, and mu phases and TCP phases of chromium, rhenium, tungsten and/or tantalum) in a gamma-prime matrix phase (characterized by a gamma/gamma-prime inversion relative to the substrate 22). Because the boundary between SRZ constituents and the original substrate 22 is a high angle boundary and doesn't resist deformation, the SRZ and its boundaries readily deform under stress, with the effect that rupture strength, ductility and fatigue resistance of the alloy are reduced.

According to a first embodiment of the invention, the bond coat 24 may be an aluminum-rich composition, for example, MCrAlX alloys, beta-phase NiAl intermetallics, and PGM-containing and PGM-based materials, including those previously discussed. Aluminum-rich bond coats naturally develop an aluminum oxide (alumina) scale 28 that inhibits further oxidation and promotes adhesion of the ceramic layer 26. To inhibit interdiffusion between the bond coat 24 and substrate 22, the bond coat 24 shown in FIG. 2 is separated from the substrate 22 by a diffusion barrier layer 32, which is preferably deposited directly on the surface of the substrate 22. To be effective, the diffusion barrier layer 32 should be formed of a material that is slow-diffusing, exhibits little interdiffusion or interaction with the substrate 22 during elevated-temperature exposures, and inhibits the interdiffusion of constituents between the substrate 22 and bond coat 24, such as aluminum and PGM's that tend to diffuse into the superalloy substrate 22 from the bond coat 24. In so doing, the barrier layer 32 is able to promote the properties and lives of the bond coat 24 and substrate 22.

Figure 4:
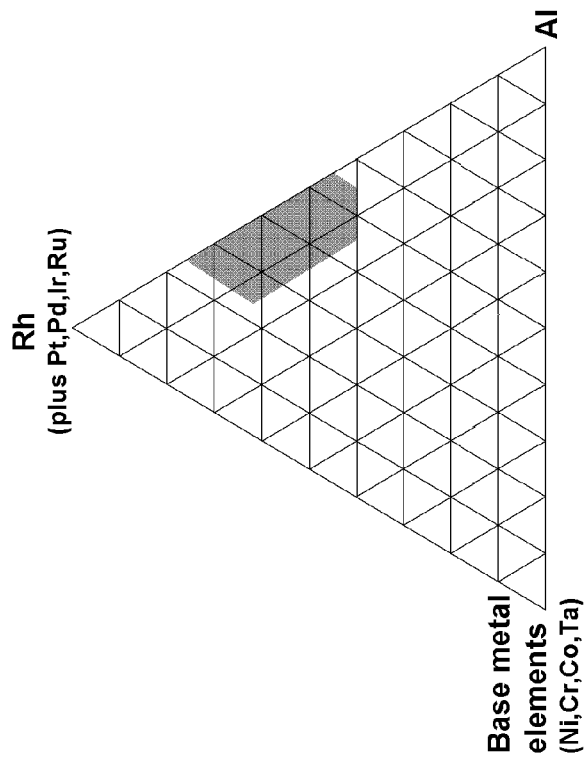
FIGS. 3 and 4 are graphs of the Rh—Al—[Ni,Cr,Co,Ta] composition field showing suitable and preferred compositions, respectively, for an overlay coating that can be used as the diffusion barrier coating or bond coat of FIG. 2.
Figure 3:
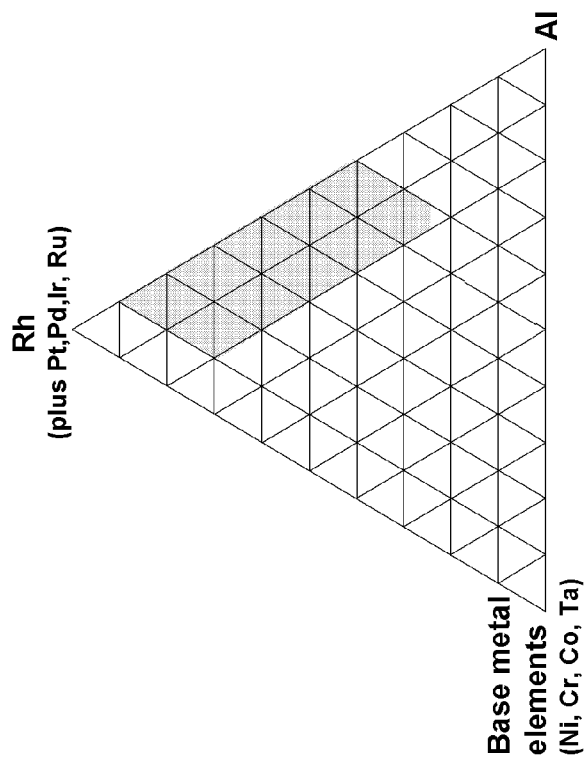

According to this embodiment of the invention, the diffusion barrier layer 32 is an overlay coating formed predominantly of an intermetallic compound of rhodium and aluminum, optionally with alloying constituents such as one or more PGM's (platinum, palladium, ruthenium, and iridium), the base metal of the substrate 22 (e.g., nickel or cobalt), and/or a major alloying constituent of the substrate 22 (e.g., chromium, tantalum, etc.). The RhAl intermetallic compound is more particularly the B2 phase, whose chemical formula is MAl. In the present invention, M is rhodium and the resulting intermetallic compound has the B2 crystal structure. Preferably, nearly all of the aluminum of the barrier layer 32 is in the B2-phase RhAl intermetallic phase. Suitable compositions for the RhAl intermetallic barrier layer 32 contain, by atomic percent, about 25% to about 90% rhodium, about 10% to about 60% aluminum, optionally up to a combined total of about 25% of platinum, palladium, ruthenium, and/or iridium, and optionally up to a combined total of about 20% of the base metal and/or major alloying constituents thereof. A more preferred range for the barrier layer 32 contains about 40% to about 75% rhodium, about 25% to about 55% aluminum, optionally up to a combined total of about 10% of platinum, palladium, ruthenium, and/or iridium, and optionally up to a combined total of about 15 atomic percent of the base metal and/or major alloying constituents thereof. Ranges for the suitable and preferred RhAl intermetallic material are graphically represented in FIGS. 3 and 4, respectively. The lower limit for the broadest aluminum range and the upper limit for the broadest rhodium range allow for some diffusion of aluminum into the diffusion barrier layer 32 from the substrate 22, as would be the propensity if insufficient aluminum is provided in the barrier layer 32 to develop a predominantly B2 RhAl structure. The upper limit for aluminum is set by the estimated aluminum limit in the RhAl phase field. The allowance for metal element limits is to reduce the degree of diffusion voiding and to account for the natural composition that is expected to form on complex superalloy substrates when exposed to elevated service temperatures. As an example, when used in combination with a substrate 22 formed of the aforementioned N5 superalloy (whose base metal is nickel with major alloying constituents including chromium, cobalt, and tantalum), the final composition for the diffusion barrier layer 32 was found to contain about 45% rhodium, about 40% aluminum, about 5% platinum group metal(s), about 8% nickel, about 2% chromium, a lesser combined amount of cobalt and/or tantalum, and trace levels of one or more refractory metals that may be the result of diffusion from the substrate 22.

The RhAl intermetallic barrier layer 32 is believed to be particularly effective when used in combination with a bond coat 24 that contains one or more PGM's (PGM-containing), and especially a bond coat 24 whose predominant constituent is a PGM (PGM-based). As a diffusion barrier, the RhAl intermetallic barrier layer 32 slows the diffusion of base and major alloying metal elements of the substrate 22 into the bond coat 24 and elements of the bond coat 24, especially PGM's and/or aluminum, into the substrate 22. The B2 phase of RhAl intermetallic is oxidation resistant, tolerant to oxygen ingress, stable, and not prone to decomposition and diffusion into the substrate 22 or bond coat 24. As a result, aluminum remains within the barrier layer 32, and therefore is available for environmental protection and does not induce SRZ in susceptible substrate materials (those containing significant amounts of one or more refractory elements, such as tungsten, rhenium, tantalum, molybdenum, and chromium). The presence of aluminum in the barrier layer 32 also inhibits depletion of aluminum in the substrate 22 and reduces diffusion voiding. A suitable thickness for the diffusion barrier layer 32 is believed to be about 3 to about 15 micrometers, though lesser and greater thicknesses are foreseeable. A variety of processes can be used to deposit the overlay barrier layer 32, including PVD processes capable of codepositing rhodium, aluminum, and the optional constituents of the layer 32. Non-limiting examples include EBPVD, sputtering, and cathodic arc (also known as IPD). Alternatively, rhodium and optional constituents of the layer 32 can be deposited first (such as by plating) after which aluminum is introduced using a suitable aluminizing process (e.g., a diffusion or CVD method) to form the RhAl intermetallic. Deposition can be followed by a diffusion heat treatment at a temperature of about 1800° F. to about 2200° F. (about 980° C. to about 1200° C.) for a duration of about one to sixteen hours.

According to another embodiment of the invention, the bond coat 24 can be predominantly or entirely formed of the B2 phase RhAl intermetallic composition described above for the diffusion barrier layer 32. A bond coat 24 of predominantly the B2 phase RhAl intermetallic produces a pure alumina scale 28 that is slow growing, protective, and provides for good adherence of the ceramic (TBC) layer 26. Notably, in this embodiment the diffusion barrier layer 32 can be omitted and the RhAl intermetallic bond coat 24 can be deposited directly on the substrate 22, though it should be understood that, depending on the particular compositions of the substrate 22 and bond coat 24, it is foreseeable that in some instances a diffusion barrier layer 32 between the RhAl intermetallic bond coat 24 and substrate 22 will be beneficial. As with the previous embodiment, the ceramic layer 26 can also be omitted, with the result that the layer of B2 phase RhAl intermetallic defines the outermost layer of the coating system 20, and as such can be termed an environmental layer. Whether a bond coat or environmental coating, suitable thicknesses for the RhAl intermetallic layer is believed to be about 5 to about 50 micrometers, though lesser and greater thicknesses are foreseeable. Suitable techniques for depositing the RhAl intermetallic layer include those mentioned above for the RhAl intermetallic diffusion layer 32.

Figure 5:
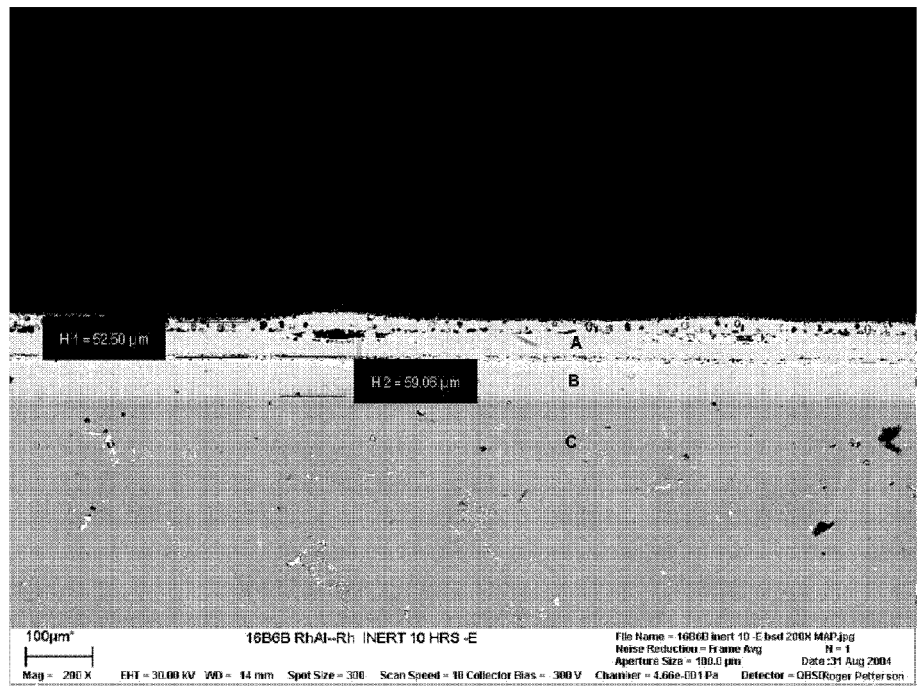
FIG. 5 is a scanned cross-sectional image of a surface region of a superalloy substrate protected with a B2-phase Rh—Al intermetallic diffusion barrier coating and a rhodium-based environmental coating.
Figure 6:
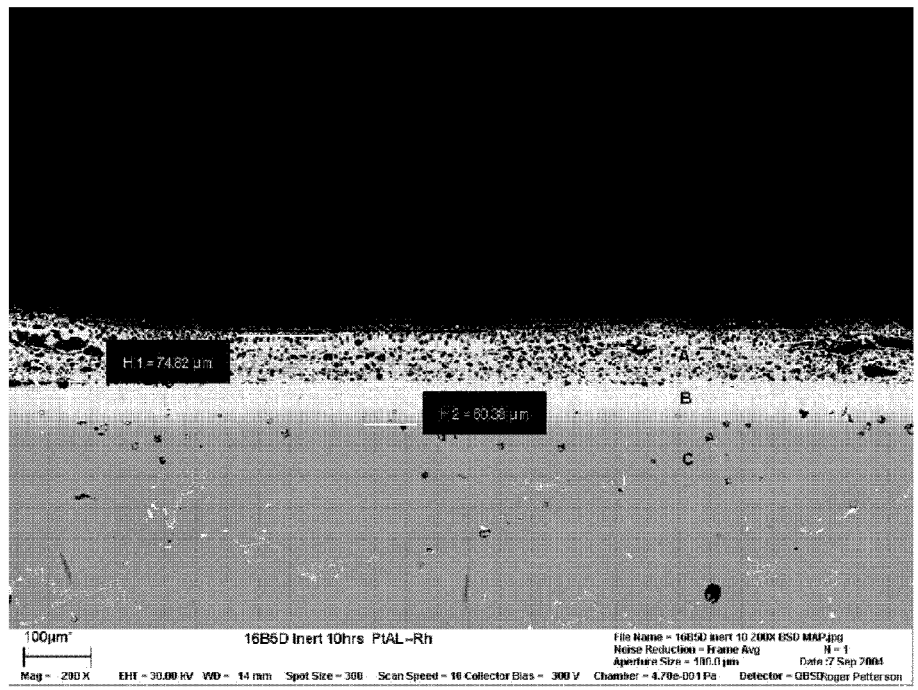
FIG. 6 is a scanned cross-sectional image of a surface region of a superalloy substrate protected with a PtAl diffusion barrier coating and a rhodium-based environmental coating.

Each embodiment of this invention has been reduced to practice. FIGS. 5 and 6 are scanned images comparing a RhAl intermetallic diffusion barrier layer to a PtAl diffusion barrier layer, respectively. The RhAl intermetallic barrier layer had an approximate composition of, by atomic percent, about 50 rhodium and about 50 aluminum. The PtAl intermetallic barrier layer had an approximate composition of, by atomic percent, about 50 platinum and about 50 aluminum. Both barrier layers were deposited by sputtering to a thickness of about 25 micrometers on Rene N5, over which an environmental coating of 100% rhodium was deposited to a thickness of about 35 micrometers (FIG. 5) and about 30 micrometers (FIG. 6). FIGS. 5 and 6 show these coating systems after an approximately ten-hour exposure at about 1190° C. in an inert atmosphere, and evidence that the degree of interdiffusion between the substrate and environmental coating was significantly reduced for the specimen provided with the RhAl diffusion barrier layer. Diffusional growth observed in the specimens of FIGS. 5 and 6 was 52 micrometers and 80 micrometers, respectively. Voiding was also reduced in the specimen with the RhAl diffusion barrier layer.

Bond coat experiments were conducted on N5 specimens in which B2 phase RhAl intermetallic material was deposited as bond coats, over which TBC's of 7% YSZ were deposited by EBPVD. The bond coats were deposited to a thickness of about 10 micrometers, and had approximate compositions of, by atomic percent, about 50 rhodium and about 50 aluminum. One of the test specimens was furnace cycle tested (FCT) to assess the spallation resistance of the TBC. The conditions of the test included one-hour cycles between near room temperature and about 2175° F. (about 1190° C.), with a dwell time of about forty-five minutes at peak temperature. The specimen was rapidly heated to the peak temperature, then fan air cooled for fifteen minutes to near room temperature. Testing of the specimen was terminated when about 20% or more of the TBC has spalled. The RhAl bond coat successfully completed 200 cycles, which is significantly better than the standard platinum aluminide historical level of 120 cycles under the same test conditions.

While the invention has been described in terms of particular embodiments, it is apparent that other forms could be adopted by one skilled in the art. Therefore, the scope of the invention is to be limited only by the following claims.

The invention claimed is:

1. A coating system on a substrate containing a base metal and alloying constituents, the coating system comprising an overlay coating on the substrate, the overlay coating being predominantly a B2-phase RhAl intermetallic material containing about 25 to about 90 atomic percent rhodium, about 10 to about 60 atomic percent aluminum, optionally up to a combined total of about 25 atomic percent of one or more platinum group metals chosen from the group consisting of platinum, palladium, ruthenium, and iridium, and optionally up to about 20 atomic percent of the base metal and alloying constituents of the substrate.

2. The coating system according to claim 1, wherein the overlay coating is an environmental coating that defines an outermost surface of the coating system.

3. The coating system according to claim 1, wherein the overlay coating is a bond coat, the coating system further comprising a ceramic coating on the bond coat.

4. The coating system according to claim 1, wherein the overlay coating is a diffusion barrier layer, the coating system further comprises a second coating on the diffusion barrier layer, and the diffusion barrier layer inhibits interdiffusion between the second coating and the substrate.

5. The coating system according to claim 4, wherein the second coating contains at least one platinum group metal chosen from the group consisting of platinum, palladium, ruthenium, and iridium, and the diffusion barrier layer inhibits diffusion of the at least one platinum group metal from the second coating to the substrate and diffusion of the base metal and alloying constituents from the substrate to the second coating.

6. The coating system according to claim 5, wherein the second coating further contains aluminum.

7. The coating system according to claim 4, wherein the second coating is a bond coat, the coating system further comprising a ceramic coating on the bond coat.

8. The coating system according to claim 1, wherein the base metal and alloying constituents of the substrate comprise nickel, chromium, cobalt, and tantalum.

9. The coating system according to claim 1, wherein the substrate is formed of a nickel-base superalloy that is susceptible to formation of a secondary reaction zone (SRZ).

10. The coating system according to claim 1, wherein the overlay coating contains about 40 to about 75 atomic percent rhodium, about 25 to about 55 atomic percent aluminum, optionally up to a combined total of about 10 atomic percent of the one or more platinum group metals chosen from the group consisting of platinum, palladium, ruthenium, and iridium, and optionally up to about 15 atomic percent of the base metal and alloying constituents of the substrate.

11. The coating system according to claim 1, wherein the overlay coating consists of the B2-phase RhAl intermetallic material.

12. The coating system according to claim 1, wherein
the base metal of the substrate is nickel;
the alloying constituents of the substrate comprise chromium, at least one of cobalt and tantalum, and at least one refractory metal; and
the overlay coating consists of, in atomic percent, about 45% rhodium, about 40% aluminum, about 5% of the one or more platinum group metals chosen from the group consisting of platinum, palladium, ruthenium, and iridium, about 8% nickel, about 2% chromium, at least one of cobalt and tantalum in a combined amount of less than 2%, and the at least one refractory metal that has diffused from the substrate.

13. The coating system according to claim 1, wherein the overlay coating does not contain platinum, palladium, ruthenium, or iridium.

14. The coating system according to claim 5, wherein the diffusion barrier layer does not contain platinum, palladium, ruthenium, or iridium.

15. The coating system according to claim 1, wherein the substrate is a portion of a gas turbine engine component.

* * * * *